United States Patent [19]
Ebey

[11] 3,820,638
[45] June 28, 1974

[54] BRAKE MOUNTING
[75] Inventor: Edward W. Ebey, Round Lake, Ill.
[73] Assignee: International Harvester Company, Chicago, Ill.
[22] Filed: Feb. 24, 1972
[21] Appl. No.: 228,858

[52] U.S. Cl. ............ 188/206 A, 188/2 R, 188/18 R, 188/327, 188/341
[51] Int. Cl. ............................................ F16d 51/20
[58] Field of Search .......... 188/2 R, 18 R, 327, 341, 188/206 A

[56] References Cited
UNITED STATES PATENTS

| | | | |
|---|---|---|---|
| 1,837,681 | 12/1931 | Schwager | 188/327 |
| 1,876,110 | 9/1932 | Ranst | 188/2 R X |
| 2,965,199 | 12/1960 | Raden | 188/341 |
| 3,185,261 | 5/1965 | Campbell et al. | 188/2 R X |
| 3,279,569 | 10/1966 | Kieser et al. | 188/206 A |
| 3,339,677 | 9/1967 | Behnke | 188/341 |
| 3,367,458 | 2/1968 | Self et al. | 188/206 A |

*Primary Examiner*—George E. A. Halvosa
*Assistant Examiner*—Edward R. Kazenske
*Attorney, Agent, or Firm*—Ronald C. Kamp; Floyd B. Harman

[57] ABSTRACT

An improved brake mounting which permits removal and installation of brake components from the inboard side of the associated wheel having a pair of brake shoes pivotally mounted from the axle housing and a brake actuator attached to the axle housing. Pins pivotally mount the brake shoes and are releasably retained by a locking means attached to the axle housing and fastening means releasably secure the actuator to the axle housing. Both the locking means and fastening means are arranged to be manipulated solely through the open inboard end of the associated brake drum.

1 Claim, 2 Drawing Figures

BRAKE MOUNTING

BACKGROUND AND SUMMARY OF THE INVENTION

In a large vehicle having drum brakes of the conventional type, the problem of relining the brake shoes and reconditioning the wheel cylinder or brake actuator becomes a more pronounced problem due to the size and weight of the vehicle, particularly the individual wheel assemblies. That is, the wheel assembly is simply too heavy for one or even two men to lift and requires a hoist or lifting device of some type to physically manipulate the tire and the rim upon which it is mounted. Hence, repair and reconditioning of the brake components in the field, where proper lifting devices often are not available, is difficult under the best conditions and frequently impossible. Brake repair and reconditioning is further complicated when the vehicle is provided with a final drive mechanism, such as a planetary gear reduction means, carried on the outboard end of the axle housing, which final drive mechanism would, with the prior art structures, have to be disassembled and removed, in addition to the removal of the tire and rim, in order to obtain access to the brake components.

It is therefore an object of this invention to provide a brake mounting which permits the removal and installation of certain brake components without the necessity of removing or otherwise disturbing the wheel assembly.

It is also an object of this invention to provide a brake assembly in which the brake shoes and brake actuator can be quickly and easily removed from the inboard side of the wheel assembly, with the wheel assembly supporting the vehicle in its normal fashion and operably mounted on the outboard end of the axle housing.

These and other objects of the present invention, and many of the attendent advantages thereof, will become more readily apparent upon a perusal of the following description and the accompanying drawings, wherein:

FIG. 1 is an elevation view, partially in cross section, of the outer portion of an axle and wheel assembly incorporating a brake according to the present invention; and FIG. 2 is a cross sectional view taken on line 2—2 of FIG. 1.

DESCRIPTION OF A PREFERRED EMBODIMENT

Figure 1:
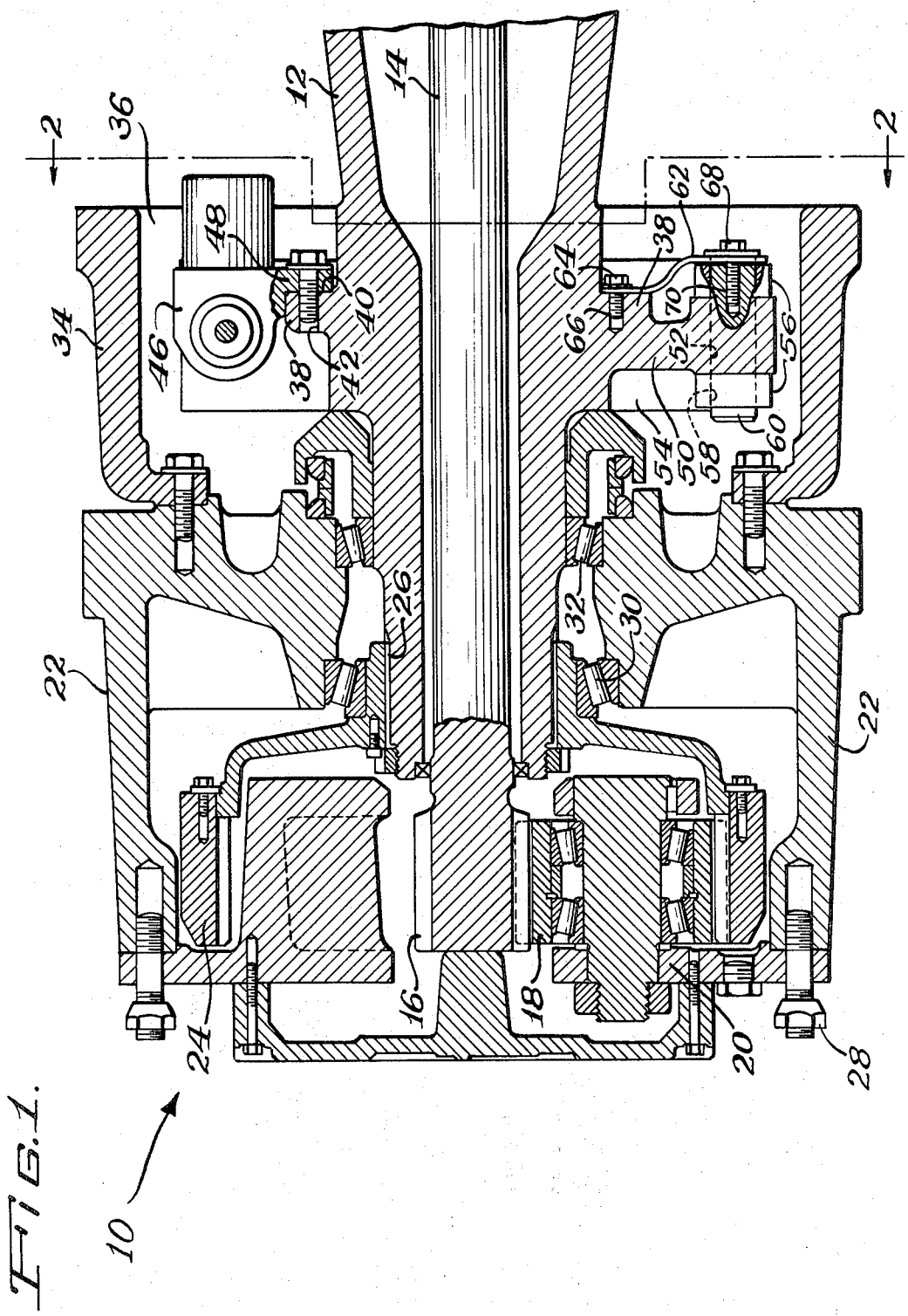
Figure 2:
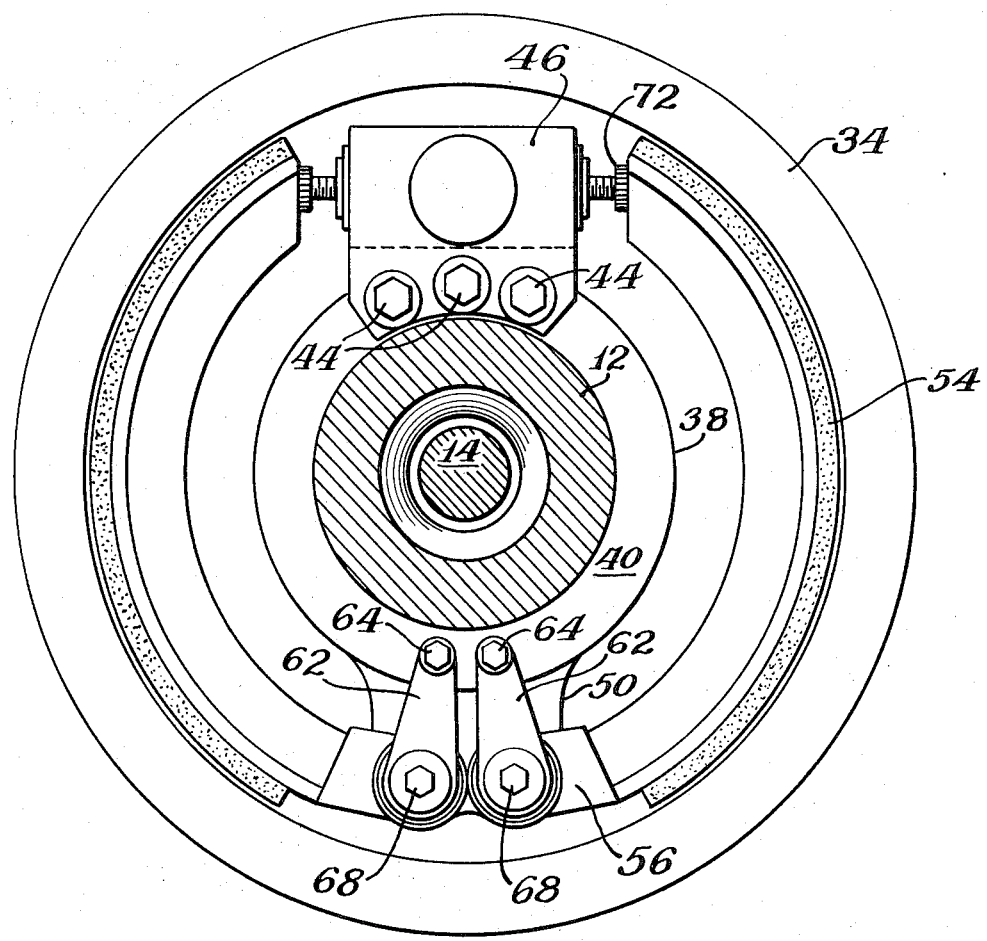

Referring now to FIGS. 1 and 2, the wheel assembly, indicated generally at 10, is rotatably mounted on the free outboard end of the axle housing 12 and is driven by the axle 14. A sun gear 16 is provided on the end of the axle 14 and drives the planet gears 18 in the final drive assembly. The planet gears 18 are rotatably mounted within a carrier 20, which carrier is connected with the wheel hub 22. The ring gear 24 meshes with the planet gears 18 and is held stationary through a spline connection 26 with the axle housing 12. Conventionally, the assembled wheel and flanged rim, not shown, are mounted on the wheel hub 22 and retained thereon by the lug bolts 28. The entire wheel assembly 10 is rotatably mounted upon axle housing 12 by means of bearings 30 and 32.

A brake drum 34 is attached to the inboard side of the wheel hub 22 and rotates with the wheel assembly 10. The brake drum 34 has an open end 36 facing toward the inboard side of the wheel assembly, which may if desired be covered by an appropriate dust shield held in place by removable fastening means. A flange 38, which defines an inboard facing shoulder 40, is provided on the axle housing 12. The upper portion of the flange 38 is provided with a plurality of tapped holes 42 capable of accepting cap screws or bolts 44. A brake actuator 46 has a flange 48 complementary to the shoulder 40 and a plurality of holes complementary with the threaded bores 42. The flange 48 is positioned on the inboard side of the flange 38 against the shoulder 40 and these cap screws 44 are threaded into the bore 42 to secure the actuator 46 to the axle housing 12.

A protrusion or extension 50 is formed on the flange 38 opposite the point of attachment of the actuator 46. The extension 50 is provided with a pair of bores 52 extending longitudinally parallel to the axle 14. A pair of brake shoes 54, each having a clevis 56 with a bore 58 therethrough are pivotally attached to the extension by means of pins 60 which extend through the bores 52, 58. These pins are held in position within these bores 52 and 58 by a pair of locking plates 62. Each locking plate is secured at its upper end to the flange 38 by means of a cap screw 64 which passes through an opening in the lock plate 62 and is received by threaded bores 66 provided in the flange 38. Each locking plate 62 is secured to one of the pins 60 at the lower end by means of a cap screw 68, which passes through an opening in the lock plate 62 and is received by a threaded bore 70 formed in the pin 60.

An adjusting bolt 72 extends from each side of the actuator 46 and engages the upper end of the brake shoes 54, and is capable upon actuation of the actuator 46 to extend the brake shoes 54 into frictional engagement with the brake drum 34. In order to remove the brake shoes for relining and/or the actuator for rebuilding or reconditioning, the adjusting bolt 72, working through the open end 36 of the brake drum 34, would be rotated to back off the adjusting screw from the brake shoe 54. The cap screws 44 would then be removed, also by manipulation through the open end 36 of the brake drum 34 releasing the actuator 46 from its attachment to the axle housing 12. The cap screw 64 would then be removed, also by manipulation through the open end 36. The locking plate 62, and hence the pin 60, would then be released from attachment to the axle housing 12, and by pulling on the locking plate 62, the pin 60 can be extracted from the bores 52 and 58. Each shoe 54 could then be rotated around the axle housing 12 until the clevis 56 clears the extension 50, and then each shoe can be removed through the open end 36 of the brake drum 34. Once the desired maintenance and repair work has been completed on the brake shoes and actuator, they are reassembled within the brake drum 34 by reversal of the above outlined procedure.

While one embodiment of the present invention has been disclosed herein, it is to be understood that various changes and modifications may be made without departing from the spirit of the invention as defined by the scope of the appended claims.

What is claimed is:

1. An improved brake mounting for a vehicle having an axle housing and a wheel assembly rotatably mounted on an outboard end of said housing, comprising:
   a brake drum attached to the inboard side of the wheel assembly and having an open end facing inboard of said housing;
   a flange on said housing including an extension having a pair of bores;
   brake shoe means disposed within said drum;
   a pair of pins complementary with said bores for pivotally attaching the brake shoe means to said extension;
   a pair of locking plates for separately connecting the respective pins to the flange;
   first bolt means securing one end of each of said locking plates to said flange;
   second bolt means securing the other end of each of said locking plates to each of the respective pins;
   actuator means engageable with the brake shoe means for expanding the brake shoe means into frictional engagement with the brake drum;
   fastening means for securing the actuator means to the flange; and
   both of said first bolt means and said fastening means being capable of manipulation through said open end to permit removal and installation of the actuator and brake shoe means from the inboard side thereof, and said locking plates serve to facilitate extraction of the pins from the bores during removal thereof.

* * * * *